US012333904B1

(12) United States Patent
McCorry

(10) Patent No.: US 12,333,904 B1
(45) Date of Patent: Jun. 17, 2025

(54) COUPON DISPENSING KIOSK

(71) Applicant: Karl McCorry, Coatesville, PA (US)

(72) Inventor: Karl McCorry, Coatesville, PA (US)

( * ) Notice: Subject to any disclaimer, the term of this patent is extended or adjusted under 35 U.S.C. 154(b) by 364 days.

(21) Appl. No.: 18/086,783

(22) Filed: Dec. 22, 2022

(51) Int. Cl.
*G07F 17/32* (2006.01)
*G07F 17/42* (2006.01)

(52) U.S. Cl.
CPC ...... *G07F 17/3248* (2013.01); *G07F 17/3223* (2013.01); *G07F 17/3246* (2013.01); *G07F 17/42* (2013.01)

(58) Field of Classification Search
CPC ............. G07F 17/3223; G07F 17/3244; G07F 17/3246; G07F 17/3255; G07F 17/42; G07F 17/24; G07B 15/02; G06Q 30/0284; G07C 1/30; G09F 2023/008
See application file for complete search history.

(56) References Cited

U.S. PATENT DOCUMENTS 7,828,646 B2 11/2010 Franks, Jr.
7,979,351 B1 * 7/2011 Vollmer ............... G06Q 20/105 705/40
8,992,305 B2 3/2015 Sanford et al.
2001/0045456 A1 * 11/2001 Smith ................... G07F 17/329 235/381
2004/0097284 A1 * 5/2004 Malich .................... G07F 17/32 463/17
2012/0047007 A1 * 2/2012 Halsey ................. G06Q 20/352 705/14.15
2020/0258318 A1 * 8/2020 Endo ...................... G08G 1/144

FOREIGN PATENT DOCUMENTS

JP 2003242539 A * 8/2003

* cited by examiner

*Primary Examiner* — Milap Shah
(74) *Attorney, Agent, or Firm* — Sanchelima & Associates, P.A.; Jesus Sanchelima; Christian Sanchelima

(57) ABSTRACT

A coupon dispensing kiosk including a kiosk assembly, a game assembly. The kiosk assembly includes a housing. The game assembly includes a display. The electronic assembly includes a central processing unit and a cash identifier. The housing includes a cash acceptor and a ticket reader. The ticket reader is used to scan a ticket. The ticket is a parking ticket. The central processing unit can be used to estimate a balance pending for the ticket. The central processing unit can be used to count and discount money introduced through the cash acceptor. The display displays a slot machine game after payment of the pending balance. The central processing unit may provide random rewards which are dispensed from the housing based on the slot machine game displayed on the display.

10 Claims, 4 Drawing Sheets

COUPON DISPENSING KIOSK

BACKGROUND OF THE INVENTION

1. Field of the Invention

The present invention relates to a coupon dispensing kiosk and, more particularly, to a coupon dispensing kiosk that provides rewards to clients for using them, the kiosk is used as an automatic parking kiosk.

2. Description of the Related Art

Several designs for dispensing kiosks have been designed in the past. None of them, however, include casino games which are played when a user pays parking to provide an award to the client.

Applicant believes that a related reference corresponds to U.S. Pat. No. 8,992,305 issued for an automated kiosk which can be placed on a casino floor and used to purchase gaming vouchers. Applicant believes that another related reference corresponds to U.S. Pat. No. 7,828,646 issued for a casino kiosk which can print coupons. None of these references, however, teach of a coupon dispensing kiosk that is comprised of a free-standing electronic kiosk that is placed in parking locations near business and used to dispense coupons or other promotional vouchers to patrons.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a coupon dispensing kiosk that includes a casino game that can be played each time that parking is paid.

It is another object of this invention to provide a coupon dispensing kiosk which is automated to pay the parking.

It is still another object of the present invention to provide a coupon dispensing kiosk that includes slots to insert bills, receive change or scan a parking ticket.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
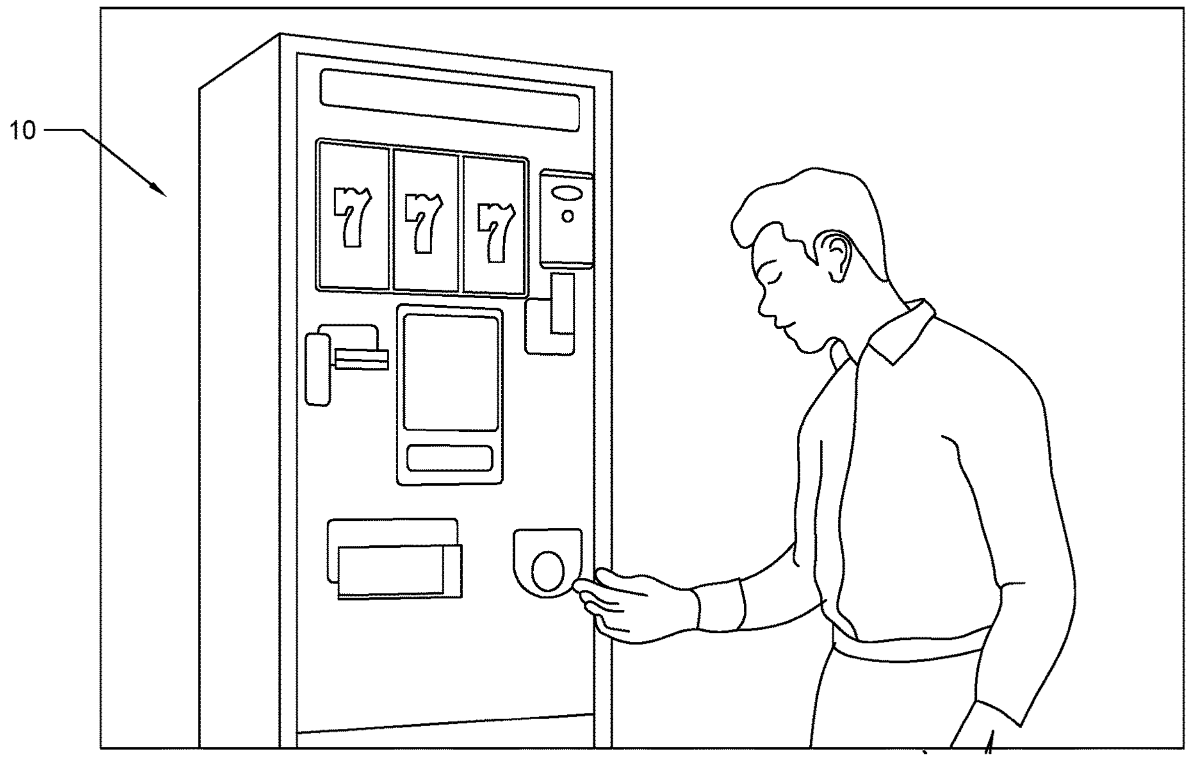
FIG. 1 represents an isometric operational view of the present invention 10 wherein a user is paying parking.
Figure 2:
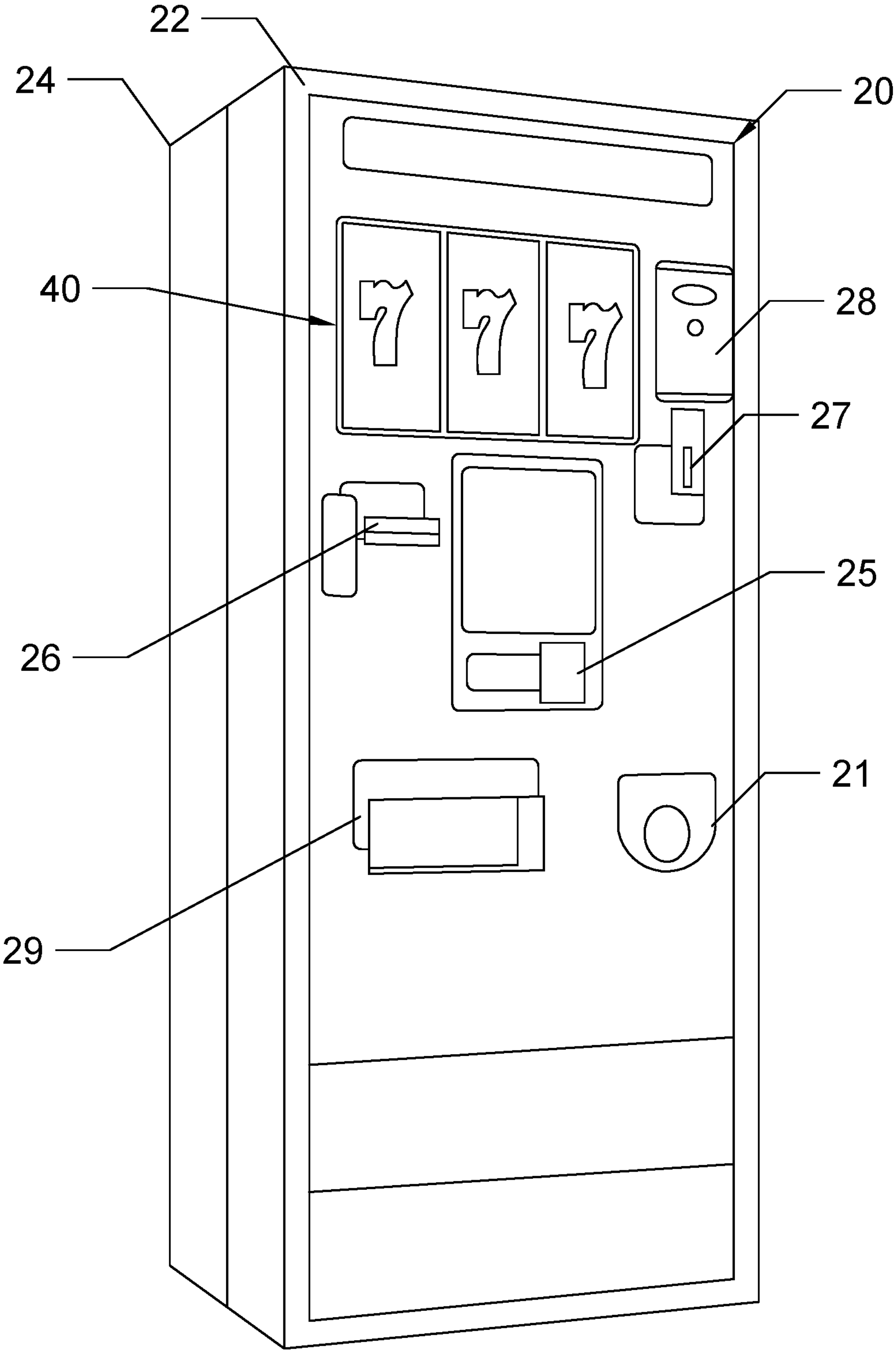
FIG. 2 shows an isometric view of the present invention 10. The present invention 10 includes a kiosk assembly 20, a game assembly 40 and an electronic assembly 60. The electronic assembly 60 is not illustrated in this figure.

Referring now to the drawings, where the present invention is generally referred to with numeral 10, it can be observed that it basically includes a kiosk assembly 20, a game assembly 40 and an electronic assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The kiosk assembly 20 may include a front housing 22, a rear housing 24, a cash acceptor 26, a coin acceptor 27, a communication element 28, hinges 31, a ticket reader 21 and a dispenser 29. The front housing 22 may have a rectangular shape. It also may be suitable for the front housing 22 to have a cylindrical shape, a triangular shape, or any other suitable shape. The front housing 22 may be made of metal. It also may be suitable for the front housing 22 to be made of plastic, wood, or any other suitable material. The front housing 22 may be hingedly attached to the rear housing 24.

Figure 3:
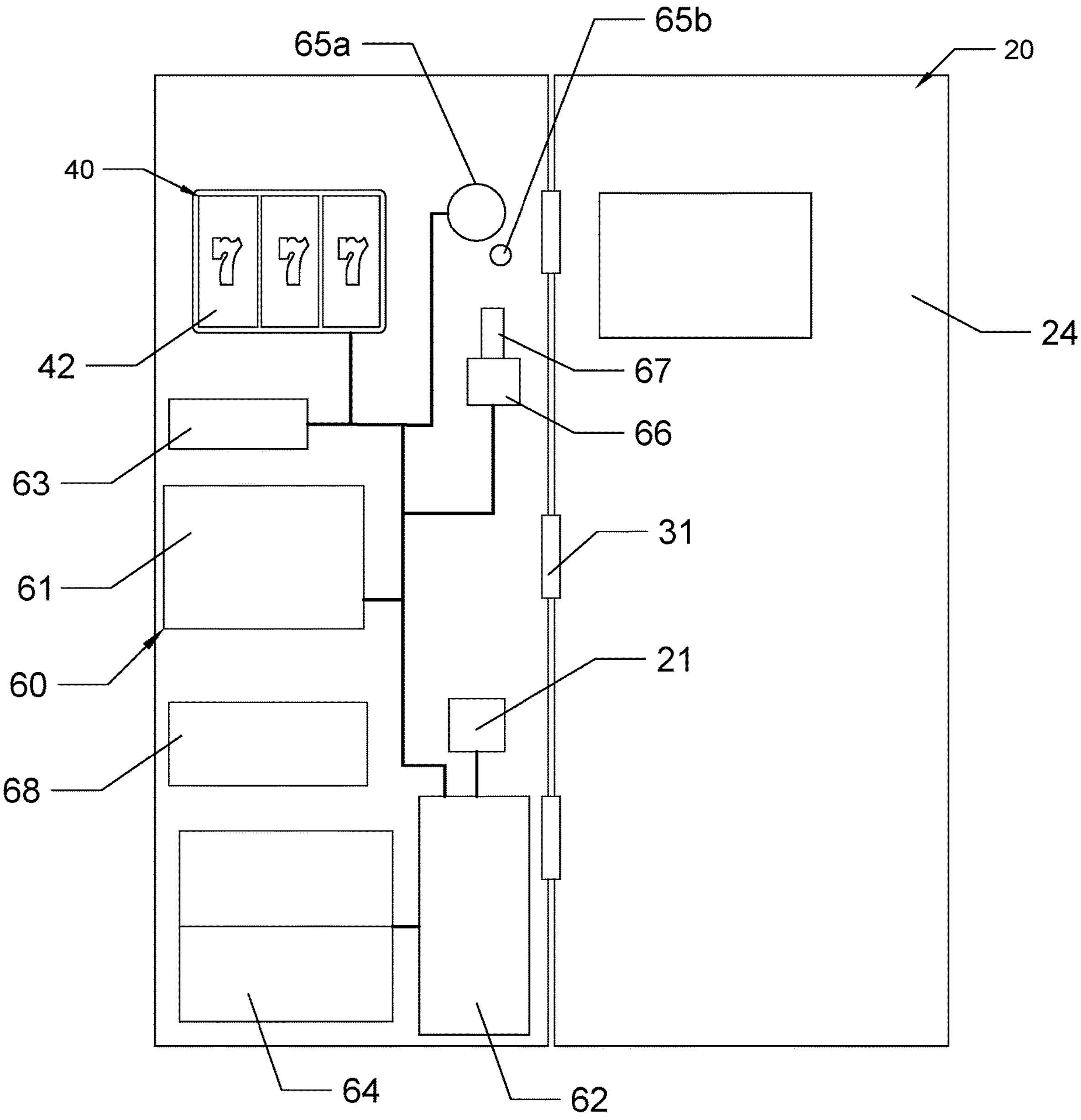
FIG. 3 is a representation of a front view of the present invention 10 in an open configuration.

The front housing 22 may have a top wall, a front wall, a bottom wall, a right wall and a left wall. The rear housing 24 may have a top wall, a rear wall, a bottom wall, a right wall and a left wall. The rear housing 24 and the front housing 22 may enclose the electronic assembly 60. As best illustrated in FIG. 3 a lateral side of the rear housing 24 and a lateral side of the rear housing 22 may be joined together by the hinges 31. Hinges 31 may allow rotation of the front housing 22 with respect to the rear housing 24. Thus, the housing defined by the front housing 22 and the rear housing 24 may be opened or closed. It should be understood that locks may be used to ensure closure of the front housing 22 with the rear housing 24. The rear housing 24 may have a rectangular shape. It also may be suitable for the rear housing 24 to have a cylindrical shape, a triangular shape, or any other suitable shape. The rear housing 24 may be made of metal. It also may be suitable for the rear housing 24 to be made of plastic, wood, or any other suitable material.

The front housing 22 may have the cash acceptor 26, the coin acceptor 27, the communication element 28 and the cash dispensing element 29 therein. The cash acceptor 26 and the coin acceptor 27 are openings in the front housing specially designed to receive bills or cash therethrough. The cash acceptor 26 may be located in a left portion of the front housing 22. The coin acceptor 27 may be placed in a front-right portion of the housing 22. The coin acceptor 27 may receive coins therethough. The cash acceptor 26 may receive cash therethrough. The cash acceptor 26 and the coin acceptor 27 may be adapted to identify types of coins and bills.

The communication element 28 may be located on a top-front portion of the front housing 22. The communication element 28 may be used to communicate with assistance in case of any issue or emergency. It should be understood that the communication element 28 may use any communication technology known in the prior art.

The dispenser element 29 may be located on a front-bottom portion of the front housing 22. The dispenser element 29 may be an opening. The dispenser element 29 may have a rectangular shape, a circular shape, or any other suitable shape. The dispenser element 29 may dispense cash and coupons. Coupons may be used to give rewards when paying the parking ticket.

The ticket reader 21 may be placed in a front-bottom portion of the front housing 22. In a preferred embodiment the ticket reader 21 may be a quick response (QR) code scanner. It also may be suitable for the ticket reader to be a near field communication reader, a radiofrequency reader, or any other reader for any technology for identification known in the prior art. The ticket reader 21 may be used to read a ticket provided to the user to calculate the total amount that user has to pay for using the parking.

The game assembly 40 may include a display 42. The display 42 may be a liquid crystal display, a surface conduction electron-emitter display, an organic light-emitting diode display, or any other suitable display known in the prior art. The display 42 may be used to display the pending balance when paying parking and to display a game to be played. In a preferred embodiment the game is a slot machine. Thus, the display 42 may display a combination of three or more reels that spin. The reels have predetermined figures or numbers and the player wins rewards depending on the combination of the displayed figures.

The electronic assembly 60 may include a central processing unit 62, a first container 66, a cash identifier 67, a microphone 65*b*, an speaker 65*a*, a cash identifier 63, storage 61, storage 64 and a second container 61. The electronic assembly 60 may be located into the front housing 22 and the rear housing 24. The central processing unit 62 may be located on a bottom inside portion of the front portion 22 and the rear portion 24. The central processing unit 62 may allow the present invention 10 to operate and calculate. The central processing unit 64 may be stored to storage 64. Storage 64 may be used to store data from users that use the present invention 10 such as entry time, type of car and the like. The storage 64 may also be used to keep track of the amounts of money introduced into the present invention 10. It should be understood that the storage 64 may use a database and a server to store data and to send and receive data The first container 66 may be in communication with the coin acceptor 27. The first container 66 may be used to store coins deposited through the coin acceptor 27. The second container 61 may be in communication with the cash acceptor 26. The second container 61 may be used to store bills deposited through the cash acceptor 26. Bills stored in the second container 61 may be dispensed as change through the dispenser 29. Coins stored in the first container 66 may be dispensed as change through the dispenser 29. Central processing unit 62 may make the operations to calculate change which may be dispensed from dispenser 29.

The cash identifier 63 may identify the currency and value of cash introduced through the cash acceptor 26. The cash identifier 63 may indicate to the central processing unit 62 the value of the cash introduced and the central processing unit 62 may calculate the pending balance or if change has to be dispensed. The coin identifier 67 may identify the currency and value of coins introduced through the coin acceptor 27. The coin identifier 67 may indicate to the central processing unit 62 the value of the coin introduced and the central processing unit 62 may calculate the pending balance or if change has to be dispensed.

The speaker 65*a* and the microphone 65*b* may be in communication with the communication element 28. Speaker 65 may be used to play a sound not limited to communication. Speaker 65 may play a sound related to the game displayed in display 42. The microphone 65 may be used to assist speaker 65 when using communication element 28.

Figure 4:
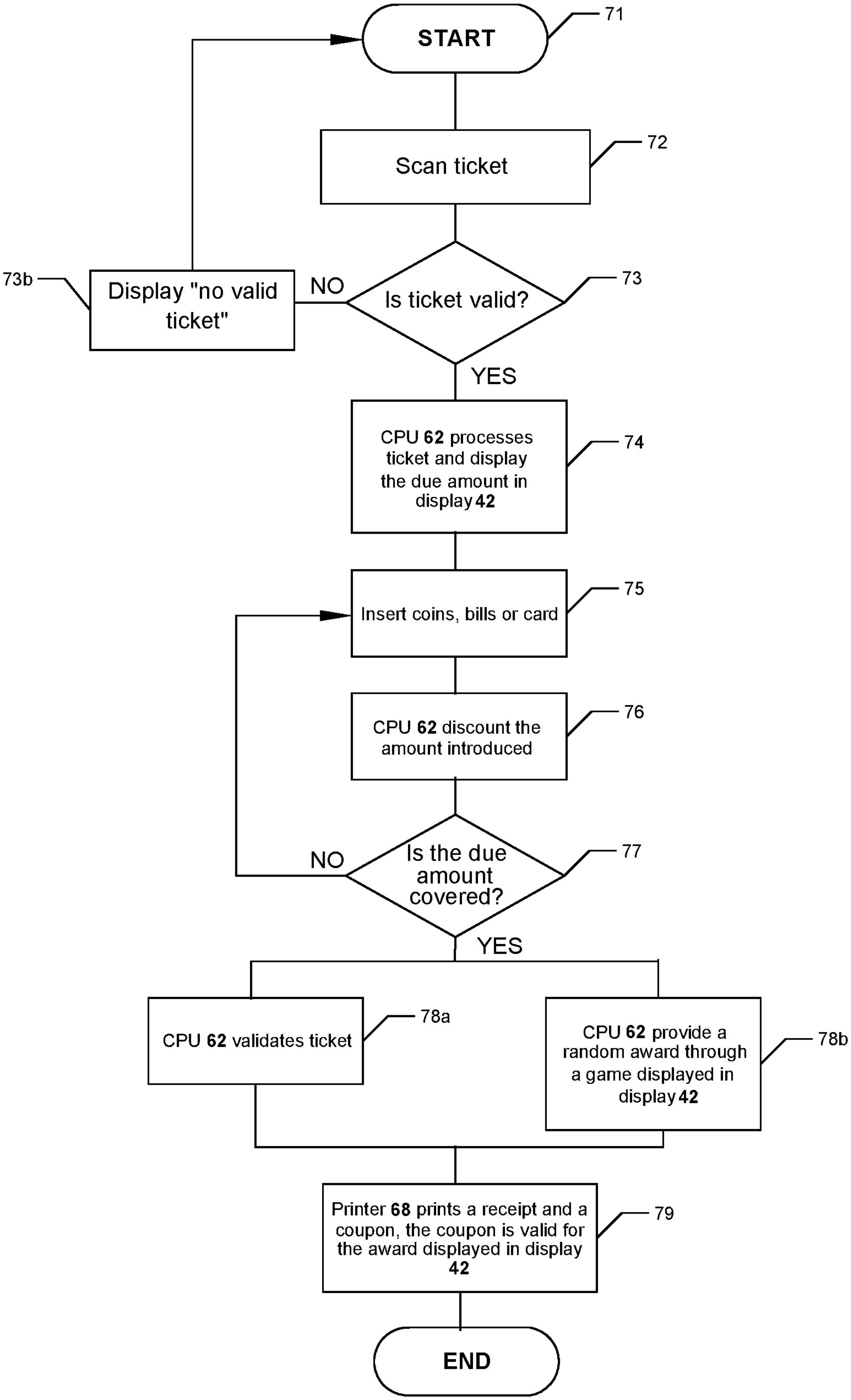
FIG. 4 is a representation of a diagram illustrating the process that uses the present invention 10.

Referring now to FIG. 4 it can be observed that the present invention 10 may follow process 70. The process 70 may include a first step 72, a second step 73, a third step 74, a fourth step 75, a fifth step 76, a sixth step 77, a seventh step 78*a* and 78*b*, and an eight step 79. The first step 72 may include scanning the ticket. The ticket is placed in the ticket reader 21 to be read. The central processing unit (CPU) 62 may verify if the ticket is a valid ticket in the second step 73. If the ticket is not valid display 42 may display "not a valid ticket" and process 70 would get back to start 71. If ticket is valid CPU 62 may process the ticket and display the due amount in display 42 in the third step 74. The fourth step 75 may include inserting cash or card to make the payment. The fifth step 76 may include the CPU 62 discounting the money introduced in fourth step 75. The sixth step 77 may include verifying if the due amount is covered in full. If the due amount is not covered then process 70 goes to the fourth step 74. If the due amount is not covered then CPU 62 validates the ticket and provides a random award through the game displayed in display 42. The random award is dispensed through dispenser 29 in the form of a coupon. The eight step 68 may include the printer 68 printing the coupon, where the coupon is valid for the award displayed in display 42.

The present invention 10 is a parking kiosk which allows the user to play a game when paying a parking ticket. The game can give the user an award in the form of a coupon. The game is preferably a slot machine displayed in display 42. The game may be interactive or fully performed by the CPU 62.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A coupon dispensing kiosk comprising:

a kiosk assembly comprising a housing having a cash acceptor and a ticket reader, wherein:

said ticket reader is configured to read a parking ticket to determine a pending balance for an elapsed time that a vehicle was parked, and said the cash acceptor is configured to receive cash to pay said pending balance;

a game assembly comprising a display device attached to a frontwall of said housing, wherein:

said display device is configured to display a predetermined game, and said predetermined game is configured to be played when said pending balance is paid; and an electronic assembly comprising a central processing unit and a cash identifier, wherein:

said electronic assembly is housed within said kiosk assembly, said central processing unit is configured to calculate said pending balance based on said elapsed time, said central processing unit is configured to actuate a container to dispense change, said central processing unit is configured to provide a random reward when said predetermined game is played, said random reward is dispensed in the form of a printed coupon, and said cash identifier is configured to identify a currency and a value of received cash.

2. The coupon dispensing kiosk of claim 1, wherein said housing includes a coin acceptor, said coin acceptor is in communication with a first container, said first container is adapted to store coins therein.

3. The coupon dispensing kiosk of claim 1, wherein said housing has a front housing and a rear housing, said front housing is hingedly attached to said rear housing.

4. The coupon dispensing kiosk of claim 1, wherein said predetermined game is a slot machine game.

5. The coupon dispensing kiosk of claim 1, wherein said parking ticket uses quick reading technology, and said ticket reader is a QR scanner.

6. The coupon dispensing kiosk of claim 1, wherein said random reward is a discount.

7. The coupon dispensing kiosk of claim 1, wherein said electronic assembly further comprises a printer, said printer is configured to print parking ticket and said printed coupon.

8. The coupon dispensing kiosk of claim 1, wherein said electronic assembly further comprises a communication element, said communication element includes a microphone and a speaker, said communication element is configured to communicate with assistance.

9. A coupon dispensing kiosk comprising:

a kiosk assembly comprising a housing having a cash acceptor, a coin acceptor, and a ticket reader, wherein:
- said ticket reader is configured to read a parking ticket to determine a pending balance for an elapsed time that a vehicle was parked,
- said cash acceptor is configured to receive cash to pay said pending balance, and
- said coin acceptor is configured to receive coins to pay said pending balance;

a game assembly comprising a display device attached to a front wall of said housing, wherein:
- said display device is configured to display a predetermined game,
- said predetermined game is configured to be played when said pending balance is paid, and
- said game is a slot machine game; and an electronic assembly comprising a central processing unit, a printer, storage, and a cash identifier, wherein:
- said electronic assembly is housed within said kiosk assembly,
- said central processing unit is configured to calculate said pending balance,
- said central processing unit is configured to actuate a container to dispense change,
- said storage is configured to store data of said parking ticket,
- said central processing unit is configured to provide a random reward when said predetermined game is played,
- said random reward is dispensed in the form of a printed coupon,
- said cash identifier is configured to identify a currency and a value of received cash, and
- said central processing unit is configured to actuate said printer to print parking tickets and said printed coupon.

10. A coupon dispensing kiosk consisting of:

a kiosk assembly comprising a housing having a cash acceptor, a coin acceptor, and a ticket reader, wherein:
- said ticket reader is configured to read a parking ticket to determine a pending balance for an elapsed time that a vehicle was parked,
- said cash acceptor is configured to receive cash to pay said pending balance,
- said coin acceptor is configured to receive coins to pay said pending balance,
- said housing has a front housing and a rear housing,
- said front housing is hingedly attached to said rear housing,
- said housing is configured to be opened or closed,
- said cash acceptor, said coin acceptor and said ticket reader are each attached to a front wall of said front housing,
- said parking ticket uses quick reading technology, and said ticket reader is a QR scanner;

a game assembly comprising a display device attached to a front wall of said housing, wherein:
- said display device is configured to display a predetermined game,
- said predetermined game is configured to be played when said pending balance is paid, and
- wherein said game is a slot machine game; and an electronic assembly comprising a central processing unit, a printer, storage, a cash identifier, and a communication element, wherein:
- said electronic assembly is housed within said kiosk assembly,
- said central processing unit is configured to calculate said pending balance,
- said central processing unit is configured to actuate a container to dispense change,
- said storage is configured to store data of said parking ticket,
- said central processing unit is configured to provide a random reward when said predetermined game is played,
- said random reward is dispensed in the form of a printed coupon,
- said cash identifier is configured to identify a currency and a value of received cash,
- said central processing unit is configured to actuate said printer to print parking tickets and said coupon,
- said communication element includes a microphone and a speaker, and
- said communication element is configured to communicate with assistance.

* * * * *